United States Patent
Pline et al.

(10) Patent No.: US 9,221,418 B1
(45) Date of Patent: Dec. 29, 2015

(54) HINGED MOUNTING SYSTEM FOR AIRBAG MODULE HAVING DEPLOYABLE LOCK

(71) Applicant: Ford Global Technologies, LLC, Dearborn, MI (US)

(72) Inventors: Kevin Bayle Pline, Plymouth, MI (US); Brian Robert Spahn, Plymouth, MI (US); Sean Bayle West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/330,587

(22) Filed: Jul. 14, 2014

(51) Int. Cl.
*B60R 21/217* (2011.01)
*B60R 21/205* (2011.01)

(52) U.S. Cl.
CPC .............. *B60R 21/217* (2013.01); *B60R 21/205* (2013.01); *B60R 2021/2173* (2013.01)

(58) Field of Classification Search
CPC  B60R 21/205; B60R 21/217; B60R 21/2155; B60R 2021/2173
See application file for complete search history.

(56) References Cited

U.S. PATENT DOCUMENTS

| | | | |
|---|---|---|---|
| 5,320,381 A | 6/1994 | Barnes et al. | |
| 5,344,184 A * | 9/1994 | Keeler et al. | 280/730.1 |
| 5,360,231 A * | 11/1994 | Adams | 280/728.2 |
| 7,293,795 B2 | 11/2007 | Kong | |
| 2003/0151238 A1* | 8/2003 | Woolley et al. | 280/732 |
| 2003/0195685 A1* | 10/2003 | Mori et al. | 701/45 |
| 2007/0278773 A1 | 12/2007 | Cowelchuck et al. | |
| 2008/0079245 A1* | 4/2008 | Bito | 280/730.1 |

FOREIGN PATENT DOCUMENTS

| | | |
|---|---|---|
| FR | 2925000 A1 | 6/2009 |
| KR | 20010008869 A | 2/2001 |

* cited by examiner

*Primary Examiner* — Drew Brown
(74) *Attorney, Agent, or Firm* — LeClairRyan

(57) ABSTRACT

A frontal passenger airbag module is provided in association with the forward part of the instrument panel adjacent the windshield. The module includes a passageway through which the airbag may be deployed. The module is movable between an operational position in which the airbag may be deployed through the a breakaway opening in the instrument panel and a stowed position in which the module is moved vehicle-rearward such that the passageway is no longer adjacent the breakaway opening and the module no longer encroaches on the crush space provided for pedestrian protection. The vehicle includes an impact sensor for determining if an impact event involves a pedestrian. If it is determined by the sensor that a pedestrian has been involved, the module is moved to its stowed position. If it is determined by the sensor that no pedestrian has been involved, then the module remains in its operational position.

17 Claims, 2 Drawing Sheets

HINGED MOUNTING SYSTEM FOR AIRBAG MODULE HAVING DEPLOYABLE LOCK

TECHNICAL FIELD

The disclosed inventive concept relates generally to airbag systems for vehicles. More particularly, the disclosed inventive concept relates to frontal passenger airbag module that is positioned forward of the instrument panel upper surface and adjacent the windscreen. The module is rotatable vehicle rearward if there is a frontal impact event so as not to be in the crush space provided adjacent the windscreen for pedestrian protection.

BACKGROUND OF THE INVENTION

Recent trends in automotive interior design focus on improving interior spaciousness. This is particularly evident in small cars where sales volumes continue to increase. A key component to improving interior spaciousness is the instrument panel. Automotive designers note that even minimal decreases in the longitudinal and vertical dimensions of the instrument panel can have a significant impact on both real and perceived foot room, legroom, visibility and overall spaciousness of the vehicle's interior. Accordingly, auto designers continue to seek ways to expand interior space of vehicles of all types.

One limiting aspect as to how much more automotive designers can expand the interior of the vehicle is the array of safety systems present in the modern automobile. The placement of the airbag module presents a particular challenge to designers. This is so because the direction of travel of the deploying airbag in an impact event must be free of obstruction under all circumstances.

There is little that can be done to reduce the physical size of the airbag module given the necessary inclusion of the folded nylon airbag, a tether (often but not always present), the inflator (including the igniter), and the housing canister itself. Accordingly, in an effort to increase the interior space of the vehicle, automotive designers attempt to relocate the module in the vehicle beyond traditional placements.

However, the availability of alternative locations for airbags is limited. For example, traditional locations for the frontal passenger airbag occupy sizeable portions of the front-middle and front-upper regions of the instrument panel.

One relocation proposal for the frontal passenger airbag that has significant opportunity to increase interior spaciousness is to relocate the frontal passenger airbag to a location relatively far forward on the instrument panel surface. This location would be very close to the intersection of the windscreen and the instrument panel. However, this location presents a variety of significant technical challenges.

One challenge is to pedestrian protection. Moving the frontal passenger airbag to a forward position close to the windscreen results in the module potentially being in the crush space ordinarily provided for passenger protection. This space provided near the windscreen is normally designed to be crushable to improve pedestrian protection However, the airbag module, being formed from a relatively rigid material, could be a danger to the impacted pedestrian by compromising the operation of the crush area typically formed between the leading edge of the windscreen and the trailing edge of the vehicle's engine hood.

As in so many areas of vehicle technology, there is always room for improvement related to steps that can be taken in the increase of vehicle interior space.

SUMMARY OF THE INVENTION

The disclosed inventive concept provides a solution to the challenges associated with expanding the size of a vehicle interior. Particularly, the disclosed inventive concept provides a frontal passenger airbag module that is positioned forward of the instrument panel upper surface and adjacent the windscreen. The module is rotatable vehicle rearward if there is a frontal impact event so as not to be in the crush space provided for pedestrian protection.

During the deployment of the passenger airbag, the primary deployment load path is aligned to the centerline of the hinge thus creating no torque to rotate the module. A deployable lock is provided that may be triggered when the airbag deploys to prevent unwanted rotation of the module from its operational mode to its stowed mode. In the event of a pedestrian impact from the outside the vehicle, the impact may cause the module to rotate around the hinge, thus being removed from the crush space.

The disclosed inventive concept includes an airbag module having an airbag passageway, a support bracket for the module, and a hinge attaching the airbag module to the support bracket that is preferably the cross car beam. The hinge allows the airbag module to be moved from its operational position in which the passageway is adjacent the instrument panel to a stowed position in which module is rotated vehicle rearward such that the passageway is not adjacent the instrument panel. A lock may be included for locking the hinge in its operational position.

The vehicle includes an impact sensor provided near the front of the vehicle for determining if an impact event involves a pedestrian. If it is determined by the sensor that a pedestrian has been involved in an impact event, the module is moved to its stowed position. Conversely, if it is determined by the sensor that no pedestrian has been involved in the impact event, then the module is allowed to remain in its operational position. In such a case, the module may be locked in its operational position if a lock is provided.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
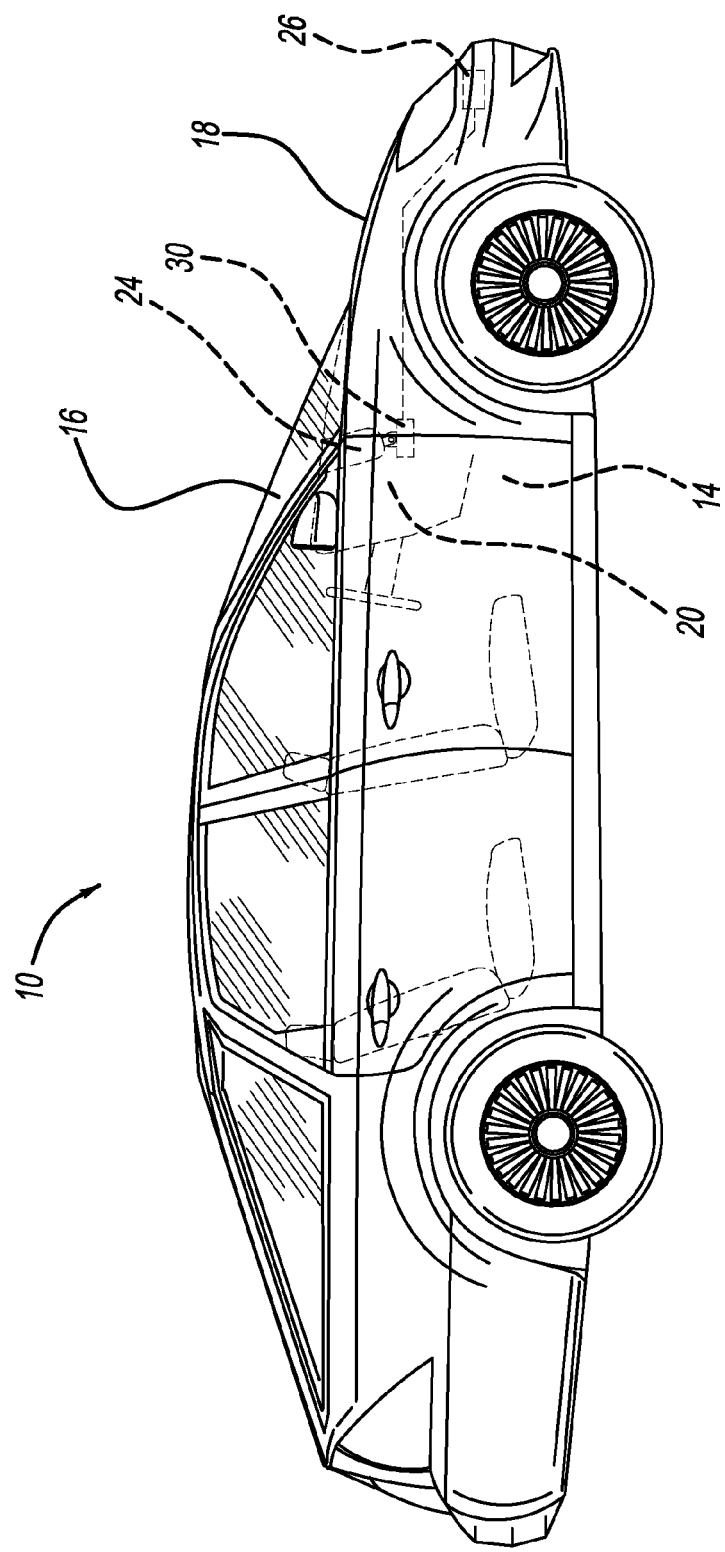
FIG. 1 illustrates view of a vehicle having the hinged airbag module of the disclosed inventive concept.

In the following figures, the same reference numerals will be used to refer to the same components. In the following description, various operating parameters and components are described for different constructed embodiments. These specific parameters and components are included as examples and are not meant to be limiting.

The disclosed inventive concept may find application in any number of vehicles, including automotive vehicles and trucks. FIG. 1 illustrates a view of an automotive vehicle, generally illustrated as 10, having an interior 14, a windscreen 16, and an engine hood 18. An instrument panel 20 is provided in the interior 14.

A safety system 22 of the disclosed inventive concept is incorporated into the vehicle 10. The safety system 22 is includes an airbag module assembly 24 that is operatively associated with an impact sensor 26. The impact sensor 26 is of the type that is able to distinguish between an object impacted such that a pedestrian can be differentiated from a non-pedestrian object.

Figure 2:
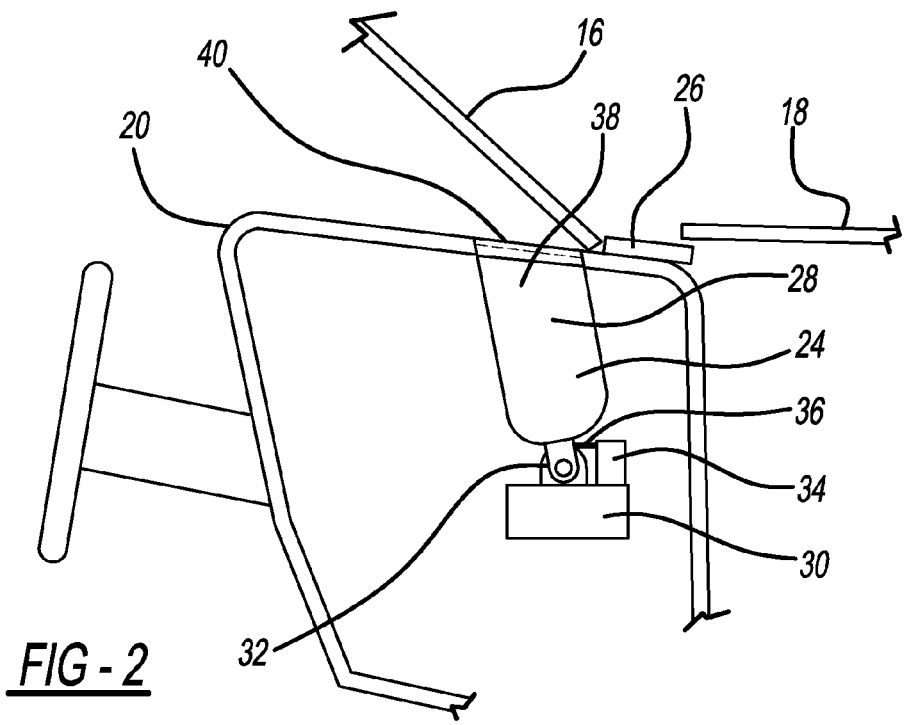
FIG. 2 illustrates a sectional view of an instrument panel, a portion of a windshield, a crush area, a portion of a vehicle hood, and the hinged airbag module shown in its operational position.
Figure 3:
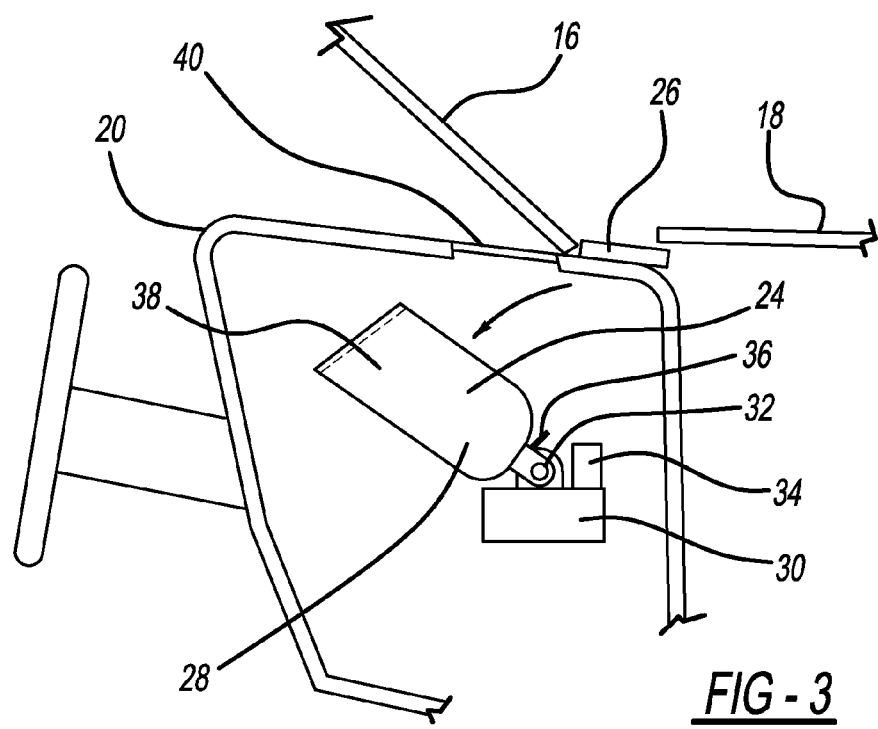
FIG. 3 illustrates the same view as illustrated in FIG. 2 but showing the hinged airbag module in its stowed position.

FIGS. 2 and 3 illustrate close up and sectional views of a portion of the windscreen 16, a portion of the engine hood 18, the instrument panel 20, and the safety system 22. The area generally forward of the windscreen 16 is a crush area 26 that is so-called as it is a weakened area of the vehicle adjacent the engine hood 18 designed to collapse in an impact event involving a pedestrian.

Referring to each of these figures, the safety system 22 includes an airbag module 28 that is attached to a body structure 30, such as a cross car beam, by a hinge 32. It is to be understood that the configuration of the airbag module 28, the body structure 30, and the hinge 32 are set forth for illustrative purposes only and are not intended as being limiting as other configurations may be possible without deviating from the disclosed inventive concept. Accordingly, the hinge 32 may be of any of a variety of structures that may hingedly attach the airbag module 28 to the body structure 30.

According to its hinged attachment to the body structure 30, the airbag module 28 is selectively movable relative to the body structure 30. Particularly, the airbag module 28 is movable from its operational position (as illustrated in FIG. 2) to its stowed position (as illustrated in FIG. 3). The airbag module 28 may be locked in the operational position shown in FIG. 2 by a locking mechanism that is released to allow the airbag module 28 to tip to its stowed position illustrated in FIG. 3.

While a number of locking arrangements are possible, a suggested locking arrangement is illustrated as a lock 34 that can selectively capture and release a locking pin 36. To retain the airbag module 28 in its operational position as shown in FIG. 2, the locking pin 36 is retained by the lock 34. To allow the airbag module 28 to be rotated to its stowed position, the locking pin 36 is released from capture by the lock 34 and the airbag module 28 is allowed to move to its stowed position as illustrated in FIG. 3.

The airbag module 28 includes an airbag deployment passageway 38. The deployment passageway 38 allows for passage of the deploying airbag as is known in the art. The instrument panel 20 includes a breakaway opening 40 formed therein. The breakaway opening 40 includes a weakened attachment construction as is known in the art that appears to be continuous with the outer surface of the instrument panel 20 but allows a deploying airbag to break through and pass into the interior 14 in an impact event.

In the operational position shown in FIG. 2, the deployment passageway 38 is positioned generally adjacent to and beneath the breakaway opening 40. As noted, the airbag module 28 may be locked in this position by the lock 34. However, it may be that the lock 34 is not necessary for effective operation of the airbag module 28 and the deploying airbag (not shown) in an impact event insofar as during the deployment of the passenger airbag, the primary deployment load path is aligned at the centerline of the hinge. According to this arrangement, no torque is created to rotate the airbag module 28 from its operational position shown in FIG. 2.

As noted above, the airbag module 28 is normally positioned in the operational position shown in FIG. 2. However, if an impact is sensed by the impact sensor 26 and if it is determined that the sensed impact is a pedestrian, then the lock 34 releases the locking pin 36 and the airbag module 28 is thus allowed to rotate to its stowed position shown in FIG. 3. With the airbag module 28 rotated away from its operational position, the airbag module 28 will not stiffen the crush area 26, thus allowing the crush area 26 to function normally.

For at least the above reasons the disclosed invention as set forth above overcomes the challenges faced by known vehicle airbag arrangements by increasing the overall interior size of the vehicle while maintaining the effectiveness of the vehicle's crush area. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A safety system for a vehicle, the vehicle having a windscreen and an instrument panel, the system comprising:
   an airbag module having an airbag passageway;
   a support bracket for said module;
   a pivotable arm attaching said module to said bracket, said arm allowing said module to be moved from its operational position in which said passageway is adjacent the instrument panel to a stowed position;
   a lock for locking said arm in said operational position.

2. The safety system for a vehicle of claim 1 wherein said support bracket is a cross car beam.

3. The safety system for a vehicle of claim 1 wherein the instrument panel has a breakaway opening and said passageway of said airbag is adjacent said breakaway opening when in said operational position.

4. The safety system for a vehicle of claim 1 further including an impact sensor.

5. The safety system for a vehicle of claim 1 further including an impact sensor operatively associated with said lock.

6. The safety system for a vehicle of claim 1 wherein said airbag module includes a deployable airbag and wherein said system further includes a breakaway opening fitted to the instrument panel through which said deployable airbag can deploy.

7. A vehicle comprising:
   a windscreen;
   areas forward and rearward of said windscreen;
   a crush zone in said forward area;
   an instrument panel in said rearward area, said panel having a front and an upper surface;
   a pivotable airbag module having a passageway, said module positioned in said panel front, said module being pivotable from a position wherein said passageway is adjacent said surface to a position wherein said passageway faces away from said windscreen; and
   a lock for locking said pivotable airbag in said operational position.

8. The vehicle of claim 7 further including a cross car beam to which said pivotable airbag module is attached.

9. The vehicle of claim 7 wherein wherein said instrument panel has a breakaway opening and said passageway of said airbag is adjacent said breakaway opening when in said operational position.

10. The vehicle of claim 9 further including an impact sensor.

11. The vehicle of claim 9 further including an impact sensor operatively associated with said lock.

12. The vehicle of claim 7 wherein said airbag module includes a deployable airbag and wherein said system further includes a breakaway opening fitted to the instrument panel through which said deployable airbag can deploy.

13. A vehicle having a front and a rear, the vehicle comprising: a windscreen;
    an instrument panel positioned vehicle rearward relative to said windscreen, said panel having a front and an upper surface;
    a pivotable airbag module having a passageway, said module positioned in said panel front, said module being pivotable from a position wherein said passageway is adjacent said surface to a position wherein said passageway faces vehicle rearward relative to said windscreen; and
    a lock for locking said pivotable airbag in said operational position.

14. The vehicle of claim 13 further including a cross car beam to which said pivotable airbag module is attached.

15. The vehicle of claim 13 wherein said position wherein said passageway of said module is adjacent said surface is the operational position of the airbag module and wherein said instrument panel has a breakaway opening and said passageway of said airbag is adjacent said breakaway opening when in said operational position.

16. The vehicle of claim 15 further including an impact sensor operatively associated with said lock.

17. The vehicle of claim 13 wherein said airbag module includes a deployable airbag and wherein said system further includes a breakaway opening fitted to the instrument panel through which said deployable airbag can deploy.

* * * * *